(12) United States Patent
Mushkatblat

(10) Patent No.: US 9,854,318 B2
(45) Date of Patent: Dec. 26, 2017

(54) SYSTEMS AND METHODS FOR SHARING INTERACTIVE MEDIA GUIDANCE INFORMATION

(75) Inventor: Yevgeniya Mushkatblat, Studio City, CA (US)

(73) Assignee: Rovi Guides, Inc., San Carlos, CA (US)

( * ) Notice: Subject to any disclaimer, the term of this patent is extended or adjusted under 35 U.S.C. 154(b) by 29 days.

(21) Appl. No.: 13/153,986

(22) Filed: Jun. 6, 2011
(Under 37 CFR 1.47)

(65) Prior Publication Data
US 2012/0311635 A1 Dec. 6, 2012

(51) Int. Cl.
*H04N 21/488* (2011.01)
*H04N 21/658* (2011.01)
(Continued)

(52) U.S. Cl.
CPC ....... *H04N 21/482* (2013.01); *H04N 21/4316* (2013.01); *H04N 21/44222* (2013.01);
(Continued)

(58) Field of Classification Search
USPC .................................................. 725/37–61
See application file for complete search history.

(56) References Cited

U.S. PATENT DOCUMENTS 4,429,385 A  1/1984 Cichelli et al.
4,625,080 A  11/1986 Scott
(Continued)

FOREIGN PATENT DOCUMENTS

DE  31 51 492   7/1983
DE  195 31 121  2/1997
(Continued)

OTHER PUBLICATIONS

"Honey, is there anything good on the remote tonight?", advertisement from Multichannel News, Broadband Week Section, Nov. 30, 1998, p. 168.
(Continued)

*Primary Examiner* — Nathan Flynn
*Assistant Examiner* — Michael Telan
(74) *Attorney, Agent, or Firm* — Haley Gulliano LLP

(57) ABSTRACT

Systems and methods for sharing interactive media guidance application information are provided. First interactive media guidance application information that is associated with media available on a first media equipment device is provided. Second interactive media guidance application information is received at the first media equipment device. The second interactive media guidance application information is associated with media available to a second media equipment device. The first interactive media guidance application information is compared with the second interactive media guidance application information to identify at least one of a similarity and a difference between the first interactive media guidance application information and the second interactive media guidance application information. A media guidance application display is generated that includes a visual indication of the at least one of the similarity and the difference between the first interactive media guidance application information and the second interactive media guidance application information.

18 Claims, 8 Drawing Sheets

(51) Int. Cl.
  *H04N 21/84* (2011.01)
  *H04N 21/482* (2011.01)
  *H04N 21/4788* (2011.01)
  *H04N 21/431* (2011.01)
  *H04N 21/442* (2011.01)
  *H04N 21/485* (2011.01)

(52) U.S. Cl.
  CPC ....... *H04N 21/4788* (2013.01); *H04N 21/485* (2013.01); *H04N 21/488* (2013.01); *H04N 21/6582* (2013.01); *H04N 21/84* (2013.01)

(56) References Cited

U.S. PATENT DOCUMENTS

| | | |
|---|---|---|
| 4,706,121 A | 11/1987 | Young |
| 4,751,578 A | 6/1988 | Reiter et al. |
| 4,761,684 A | 8/1988 | Clark et al. |
| 4,787,063 A | 11/1988 | Muguet |
| 4,908,707 A | 3/1990 | Kinghorn |
| 5,036,314 A | 7/1991 | Barillari et al. |
| 5,089,885 A | 2/1992 | Clark |
| 5,113,259 A | 3/1992 | Romesburg et al. |
| 5,132,992 A | 7/1992 | Yurt et al. |
| 5,155,591 A | 10/1992 | Wachob |
| 5,223,924 A | 6/1993 | Strubbe |
| 5,233,423 A | 8/1993 | Jernigan et al. |
| 5,253,066 A | 10/1993 | Vogel |
| 5,335,277 A | 8/1994 | Harvey et al. |
| 5,353,121 A | 10/1994 | Young et al. |
| 5,359,367 A | 10/1994 | Stockill |
| 5,382,983 A | 1/1995 | Kwoh et al. |
| 5,410,326 A | 4/1995 | Goldstein |
| 5,414,756 A | 5/1995 | Levine |
| 5,455,570 A | 10/1995 | Cook et al. |
| 5,465,113 A | 11/1995 | Gilboy |
| 5,469,206 A | 11/1995 | Strubbe et al. |
| 5,479,266 A | 12/1995 | Young et al. |
| 6,169,543 B1 | 1/2001 | Wehmeyer |
| 6,239,794 B1 | 5/2001 | Yuen et al. |
| 6,388,714 B1 | 5/2002 | Schein et al. |
| 6,564,378 B1 | 5/2003 | Satterfield et al. |
| 6,756,997 B1 | 6/2004 | Ward, III et al. |
| 7,165,098 B1 | 1/2007 | Boyer et al. |
| 7,200,852 B1 | 4/2007 | Block |
| 7,428,744 B1 | 9/2008 | Ritter et al. |
| 8,046,801 B2 | 10/2011 | Ellis et al. |
| 8,245,257 B1* | 8/2012 | Stettner ............... 725/54 |
| 8,413,060 B1* | 4/2013 | Agrawal ............... 715/753 |
| 8,856,833 B2 | 10/2014 | Conness et al. |
| 2002/0032907 A1 | 3/2002 | Daniels |
| 2002/0056087 A1 | 5/2002 | Berezowski et al. |
| 2002/0056119 A1 | 5/2002 | Moynihan |
| 2002/0059610 A1 | 5/2002 | Elllis |
| 2002/0075402 A1 | 6/2002 | Robson et al. |
| 2002/0078453 A1 | 6/2002 | Kuo |
| 2002/0090203 A1 | 7/2002 | Mankovitz |
| 2002/0157099 A1 | 10/2002 | Schrader et al. |
| 2002/0165751 A1 | 11/2002 | Upadhya |
| 2002/0165770 A1 | 11/2002 | Khoo et al. |
| 2002/0174430 A1 | 11/2002 | Ellis et al. |
| 2002/0194586 A1 | 12/2002 | Gutta et al. |
| 2002/0194600 A1 | 12/2002 | Ellis et al. |
| 2003/0005440 A1 | 1/2003 | Axelsson |
| 2003/0014759 A1* | 1/2003 | Van Stam ............... 725/97 |
| 2003/0066085 A1 | 4/2003 | Boyer et al. |
| 2003/0070177 A1 | 4/2003 | Kondo et al. |
| 2003/0093803 A1 | 5/2003 | Ishikawa et al. |
| 2003/0110499 A1 | 6/2003 | Knudson et al. |
| 2003/0140343 A1 | 7/2003 | Falvo et al. |
| 2003/0149621 A1 | 8/2003 | Shteyn |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0208756 A1 | 11/2003 | Macrae et al. |
| 2003/0237093 A1 | 12/2003 | Marsh |
| 2004/0064835 A1 | 4/2004 | Bellwood et al. |
| 2004/0070491 A1 | 4/2004 | Huang et al. |
| 2004/0097246 A1 | 5/2004 | Welch |
| 2004/0103434 A1 | 5/2004 | Ellis |
| 2004/0117831 A1 | 6/2004 | Ellis et al. |
| 2004/0158855 A1 | 8/2004 | Gu |
| 2004/0177370 A1 | 9/2004 | Dudkiewicz |
| 2004/0210926 A1 | 10/2004 | Francis et al. |
| 2004/0210932 A1 | 10/2004 | Mori et al. |
| 2004/0268403 A1 | 12/2004 | Krieger |
| 2005/0028208 A1 | 2/2005 | Ellis et al. |
| 2005/0120373 A1 | 6/2005 | Thomas et al. |
| 2005/0128718 A1 | 6/2005 | Liu et al. |
| 2005/0138660 A1 | 6/2005 | Boyer et al. |
| 2005/0149966 A1 | 7/2005 | Fairhurst |
| 2005/0160461 A1 | 7/2005 | Baumgartner et al. |
| 2005/0204388 A1 | 9/2005 | Knudson et al. |
| 2005/0251827 A1 | 11/2005 | Ellis et al. |
| 2005/0259963 A1 | 11/2005 | Sano et al. |
| 2005/0278741 A1 | 12/2005 | Robarts et al. |
| 2006/0020973 A1* | 1/2006 | Hannum et al. ............... 725/46 |
| 2006/0026635 A1 | 2/2006 | Potrebic et al. |
| 2006/0026665 A1 | 2/2006 | Rodriquez et al. |
| 2006/0031883 A1 | 2/2006 | Ellis et al. |
| 2006/0053449 A1 | 3/2006 | Gutta |
| 2006/0098221 A1 | 5/2006 | Ferlitsch |
| 2006/0101492 A1 | 5/2006 | Lowcock |
| 2006/0190978 A1 | 8/2006 | Russ et al. |
| 2006/0218573 A1 | 9/2006 | Proebstel |
| 2006/0218604 A1 | 9/2006 | Proebstel |
| 2006/0253874 A1 | 11/2006 | Stark et al. |
| 2006/0263758 A1 | 11/2006 | Crutchfield et al. |
| 2006/0265427 A1 | 11/2006 | Cohen et al. |
| 2006/0271959 A1 | 11/2006 | Jacoby et al. |
| 2006/0277579 A1 | 12/2006 | Inkinen |
| 2006/0294574 A1 | 12/2006 | Cha |
| 2007/0033607 A1 | 2/2007 | Bryan |
| 2007/0036303 A1 | 2/2007 | Lee et al. |
| 2007/0055989 A1 | 3/2007 | Shanks et al. |
| 2007/0074245 A1 | 3/2007 | Nyako et al. |
| 2007/0076665 A1 | 4/2007 | Nair et al. |
| 2007/0089132 A1 | 4/2007 | Qureshey et al. |
| 2007/0130089 A1 | 6/2007 | Chiu |
| 2007/0130283 A1 | 6/2007 | Klein et al. |
| 2007/0157240 A1 | 7/2007 | Walker |
| 2007/0157281 A1 | 7/2007 | Ellis et al. |
| 2007/0161402 A1 | 7/2007 | Ng et al. |
| 2007/0162850 A1 | 7/2007 | Adler et al. |
| 2007/0186240 A1 | 8/2007 | Ward et al. |
| 2007/0283395 A1 | 12/2007 | Wezowski |
| 2008/0046930 A1 | 2/2008 | Smith et al. |
| 2008/0046935 A1 | 2/2008 | Krakirian |
| 2008/0059988 A1 | 3/2008 | Lee et al. |
| 2008/0074546 A1 | 3/2008 | Almoumen |
| 2008/0077965 A1 | 3/2008 | Kamimaki et al. |
| 2008/0127253 A1 | 5/2008 | Zhang et al. |
| 2008/0134256 A1 | 6/2008 | DaCosta |
| 2008/0155585 A1 | 6/2008 | Craner et al. |
| 2008/0184294 A1 | 7/2008 | Lemmons et al. |
| 2008/0196068 A1 | 8/2008 | Tseng |
| 2008/0250450 A1 | 10/2008 | Larner et al. |
| 2008/0282288 A1 | 11/2008 | Heo |
| 2008/0300985 A1 | 12/2008 | Shamp et al. |
| 2009/0125971 A1 | 5/2009 | Belz et al. |
| 2009/0150925 A1 | 6/2009 | Henderson |
| 2009/0158162 A1 | 6/2009 | Imai |
| 2009/0165046 A1 | 6/2009 | Stallings et al. |
| 2009/0183208 A1 | 7/2009 | Christensen et al. |
| 2009/0210898 A1 | 8/2009 | Childress et al. |
| 2009/0217335 A1 | 8/2009 | Wong et al. |
| 2009/0249391 A1 | 10/2009 | Klein et al. |
| 2009/0288131 A1 | 11/2009 | Kandekar et al. |
| 2009/0288132 A1 | 11/2009 | Hedge |
| 2009/0300680 A1* | 12/2009 | Cook ............... H04N 5/44543 725/44 |
| 2009/0301729 A1 | 12/2009 | Broos et al. |
| 2009/0313658 A1 | 12/2009 | Nishimura |

(56) References Cited

U.S. PATENT DOCUMENTS

| | | | |
|---|---|---|---|
| 2010/0053458 A1 | 3/2010 | Anglin et al. | |
| 2010/0107194 A1 | 4/2010 | McKissick et al. | |
| 2010/0146445 A1 | 6/2010 | Kraut | |
| 2010/0146560 A1 | 6/2010 | Bonfrer | |
| 2010/0146573 A1 | 6/2010 | Richardson et al. | |
| 2010/0169072 A1 | 7/2010 | Zaki et al. | |
| 2010/0199313 A1 | 8/2010 | Rhim | |
| 2010/0310234 A1 | 12/2010 | Sigvaldason | |
| 2011/0016492 A1 | 1/2011 | Mori et al. | |
| 2011/0029922 A1 | 2/2011 | Hoffberg et al. | |
| 2011/0069940 A1 | 3/2011 | Shimy et al. | |
| 2011/0070819 A1 | 3/2011 | Shimy et al. | |
| 2011/0072452 A1 | 3/2011 | Shimy et al. | |
| 2011/0078731 A1 | 3/2011 | Nishimura | |
| 2011/0107388 A1 | 5/2011 | Lee et al. | |
| 2011/0131593 A1* | 6/2011 | Scott et al. | 725/9 |
| 2011/0163939 A1 | 7/2011 | Tam et al. | |
| 2011/0164175 A1 | 7/2011 | Chang et al. | |
| 2011/0167447 A1 | 7/2011 | Wong | |
| 2011/0258211 A1 | 10/2011 | Kalisky et al. | |
| 2012/0105720 A1 | 5/2012 | Chung et al. | |
| 2012/0114303 A1 | 5/2012 | Chung et al. | |
| 2012/0311635 A1 | 12/2012 | Mushkatblat | |

FOREIGN PATENT DOCUMENTS

| | | |
|---|---|---|
| DE | 197 40 079 | 3/1999 |
| EP | 0 774 853 | 5/1997 |
| EP | 0 793 225 | 9/1997 |
| EP | 0 805 594 | 11/1997 |
| EP | 1 363 452 | 11/2003 |
| EP | 1 538 838 | 6/2005 |
| EP | 2 129 113 | 12/2009 |
| EP | 2 154 882 | 2/2010 |
| EP | 2 299 711 | 3/2011 |
| GB | 2 265 792 | 10/1993 |
| GB | 2 458 727 | 10/2009 |
| JP | 03-022770 | 1/1991 |
| JP | 08-056352 | 2/1996 |
| JP | 09-102827 | 4/1997 |
| WO | WO 87/003766 | 6/1987 |
| WO | WO 89/003085 | 4/1989 |
| WO | WO 94/014282 | 6/1994 |
| WO | WO 95/001059 | 1/1995 |
| WO | WO 95/010910 | 4/1995 |
| WO | WO 95/028055 | 10/1995 |
| WO | WO 95/032585 | 11/1995 |
| WO | WO 96/007270 | 3/1996 |
| WO | WO 96/013932 | 5/1996 |
| WO | WO 96/020555 | 7/1996 |
| WO | WO 97/013368 | 4/1997 |
| WO | WO 97/031480 | 8/1997 |
| WO | WO 97/036422 | 10/1997 |
| WO | WO 97/047106 | 12/1997 |
| WO | WO 97/047143 | 12/1997 |
| WO | WO 97/049237 | 12/1997 |
| WO | WO 97/050251 | 12/1997 |
| WO | WO 98/010589 | 3/1998 |
| WO | WO 98/016062 | 4/1998 |
| WO | WO 98/017064 | 4/1998 |
| WO | WO 98/026584 | 6/1998 |
| WO | WO 99/014945 | 3/1999 |
| WO | WO 99/014947 | 3/1999 |
| WO | WO 99/030491 | 6/1999 |
| WO | WO 00/033576 | 6/2000 |
| WO | WO 01/091458 | 11/2001 |
| WO | WO 2007/036891 | 4/2007 |
| WO | WO 2009/067670 | 5/2009 |
| WO | WO 2009/148056 | 12/2009 |
| WO | WO 2009/151635 | 12/2009 |
| WO | WO 2011/008638 | 1/2011 |
| WO | WO 2011/037761 | 3/2011 |
| WO | WO 2011/037781 | 3/2011 |
| WO | WO 2011/084950 | 7/2011 |
| WO | WO 2012/170205 | 12/2012 |

OTHER PUBLICATIONS

"How Evolve Works," from the Internet at http://www.evolveproducts.com/network.html, printed on Dec. 28, 1998.

"Jini Architecture Overview," by Jim Waldo, from the Internet at http://Java.sun.com/products/jini/whitepapers/architectureoverview.pdf/ printed on Jan. 25, 1999. The document bears a copyright date of 1998.

"Reaching your subscribers is a complex and costly process—until now," from the Internet at http://www.evolveproducts.com/info.html, printed on Dec. 28, 1998.

"Sun's Next Steps in Digital Set-Tops," article in Cablevision, Nov. 16, 1998, p. 56.

"The Evolve EZ Guide. The Remote Control," from the Internet at http://www.evolveproducts.com/display2.html, printed on Dec. 28, 1998.

"Using Starsight 2," published before Apr. 19, 1995.

"What is Jini?", from the Internet at http://java.sun.com/products/jini/whitepapers/whatsjini.pdf, printed on Jan. 25, 1999.

"Why Jini Now?", from the internet at http://java.sun.com/products/jini/whitepapers/whyjininow.pdf, printed on Jan. 25, 1999. The document bears a copyright date of 1998.

Darrow, A. et al., "Design Guidelines for Technology-Mediated Social Interaction in a Presence Sensing Physical Space," Carnegie Mellon University Research Showcase, Carnegie Institute of Technology, Jan. 1, 2007, pp. 1-9.

Eitz, Gerhard, Zukunftige Informations—Und Datenangebote Beim Digitalen Fernsehen—EPG Und "Lesezeichen," Rundfunktechnische Mitteilungen, vol. 41, pp. 67-72, Apr. 30, 1997. (English language translation attached.).

Index Systems Inc., "Gemstar Service Object Model," Data Format Specification, Ver. 2.0.4, pp. 58-59, Dec. 20, 2002.

Jaidev, "EXSLT—A Wired and Wireless Case Study," http://csharpcomputing.com/XMLTutorial/Lession15.htm, Oct. 14, 2005.

Neumann, Andreas, "WDR Online Aufbau Und Perspektiven Automatisierter Online-Dienste Im WDR," Rundfunktechnische Mitteilungen, vol. 41, Jan. 21, 1997, pp. 56-66. (English language translation attached.).

International Search Report and Written Opinion for International Application No. PCT/US2012/039139, dated Apr. 29, 2013, 6 pages.

U.S. Appl. No. 09/354,344, filed Jul. 16, 1999, Ellis et al.
U.S. Appl. No. 09/356,161, filed Jul. 16, 1999, Ellis et al.

* cited by examiner

SYSTEMS AND METHODS FOR SHARING INTERACTIVE MEDIA GUIDANCE INFORMATION

BACKGROUND OF THE INVENTION

This application relates to interactive media guidance applications within a network of media equipment devices.

SUMMARY OF THE INVENTION

Systems and methods for sharing interactive media guidance information are described herein. Users within a community or group of media equipment devices can view the access history and selections each user makes using their respective media equipment devices. More specifically, users may be presented with multiple interactive media guidance applications information or displays in a single display, where each interactive media guidance application corresponds to different users in the community or group and includes visual indicators identifying similarities and distinctions between the interactive media guidance applications of the users.

In some embodiments, a first user may receive or send an invitation to share interactive media guidance information. In particular, the first user may receive, at a first media equipment device, from a second user an invitation to view media selections made with a second media equipment device. The second user may be a single user or media equipment device or may represent a particular group of users or media equipment devices (e.g., a household). In some implementations, accepting the invitation may allow the first user to see which media (e.g., programs) are available to the second media equipment device (or available to the second user) using the shared interactive media guidance application information.

In some embodiments, when the first user accepts the invitation, the second media equipment device may transmit to the first media equipment device interactive media guidance application information corresponding to the second media equipment device. The interactive media guidance application information may include a media schedule of media available to the second media equipment device (or second user) and any media selections made using the second media equipment device (or media selections made by the second user). A media asset is selected on a media equipment device (e.g., first or second media equipment device) when the media asset is viewed or accessed for a predetermined period of time (e.g., more than 5 minutes), scheduled for recording, has a reminder set, and/or ordered.

In some embodiments, the received second interactive media guidance application information may be compared with the first interactive media guidance application information to identify similarities (shared attributes) and differences between the first and second interactive media guidance application information. In particular, the interactive media guidance application information may be compared to identify identical or similar media which have been selected using both the first and the second media equipment devices. The interactive media guidance application information may be compared to identify differences in media availability (e.g., different geographical regions or service providers of the media equipment devices may result in different media availabilities) and selections between the first and the second media equipment devices.

In some embodiments, visual indicators may be inserted for display with the first and second interactive media guidance application information displays. In particular, a visual indicator may be added to indicate similarities (shared attributes) between the first and second interactive media guidance application information. Similarly, a visual indicator may be added to indicate differences between the first and second interactive media guidance application information. The visual indicators may be configured by the first user to uniquely identify the second user (or second media equipment device) in addition to providing the indication of similarity and differences between the media selected by the different users.

In some embodiments, a media guidance application display may be generated that includes the first and the second interactive media guidance application information and the inserted visual indicators. In particular, the media guidance application display may provide media schedules associated with the first and second interactive media guidance application information in separate windows or as a combined display in a single grid. The first user may browse the displayed first and second interactive media guidance application information displays to identify the media selections made by the second user in the past (e.g., recorded programs, programs watched or accessed for a predetermined period of time, programs for which reminders were provided), in real-time (e.g., program currently being watched or accessed) and in the future (e.g., scheduled reminders, orders and recordings).

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

Figure 1:
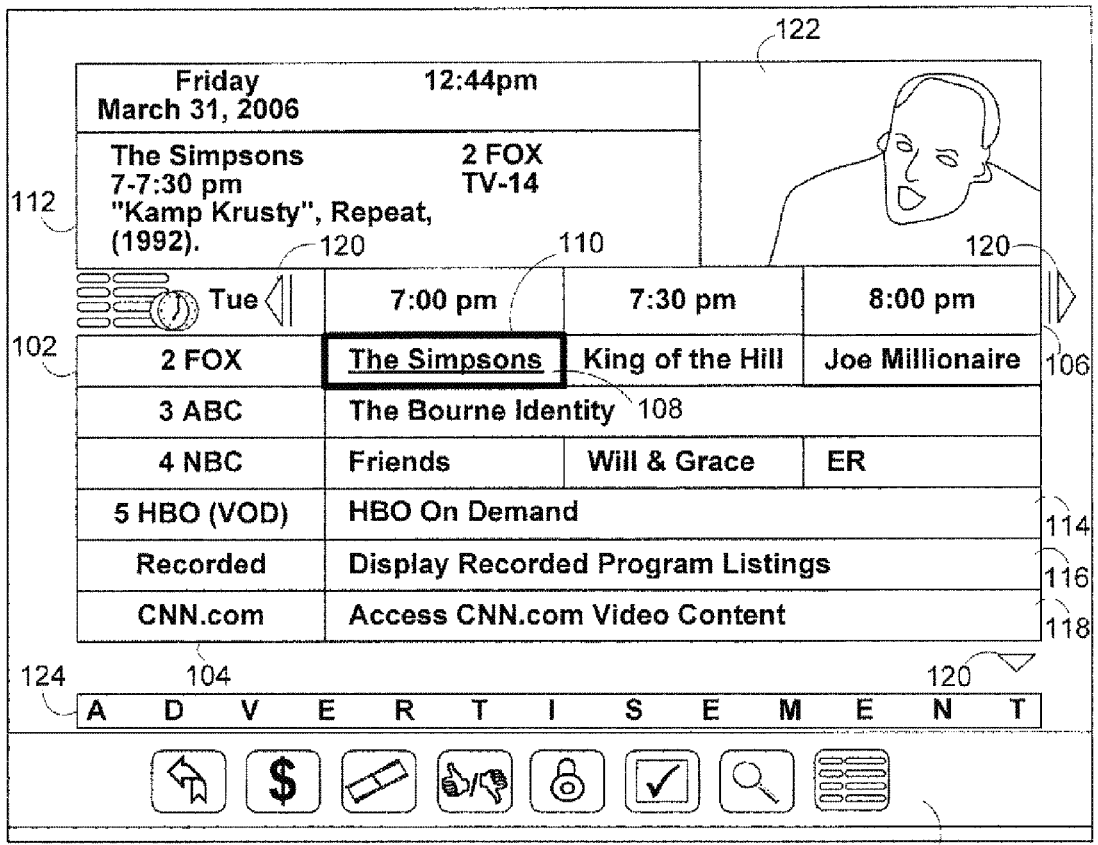
FIGS. 1 and 2 show illustrative display screens that may be used to provide media guidance application listings in accordance with an embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application, interactive program guide, or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as online applications (i.e., provided on a website), or as stand-alone applications or clients on hand-held computers, PDAs, mobile telephones, or other mobile devices. The various devices and platforms that may implement media guidance applications are described in more detail below.

Figure 2:
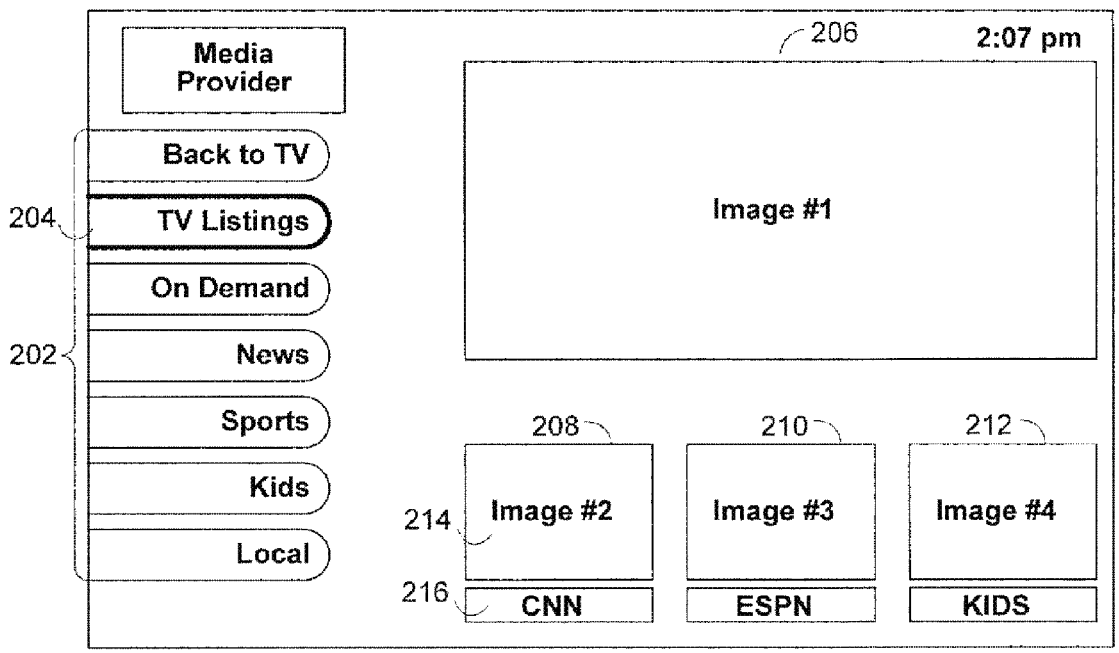

One of the functions of the media guidance application is to provide media listings and media information to users. FIGS. 1-2 show illustrative display screens that may be used to provide media guidance, and in particular media listings. The display screens shown in FIGS. 1-2 and 5-8 may be implemented on any suitable device or platform. While the displays of FIGS. 1-2 and 5-8 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

Options region 126 may include an option to view a multiple guide display (separately or combined). The multiple guide display may include interactive media guidance application information associated with a first user (e.g., the user of the media equipment device) and interactive media guidance application information associated with a second user of a different media equipment device (e.g., a different user(s) in a community or group of media equipment devices who is sharing their program guide information with the first user and/or group), as discussed below in connection with FIGS. 6-8. Options region 126 may include an option to navigate to display 500 (FIG. 5) which may be used to select, add or remove group members with whom interactive media guidance application information is shared and from whom interactive media guidance application information is received.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov. 9, 1999, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
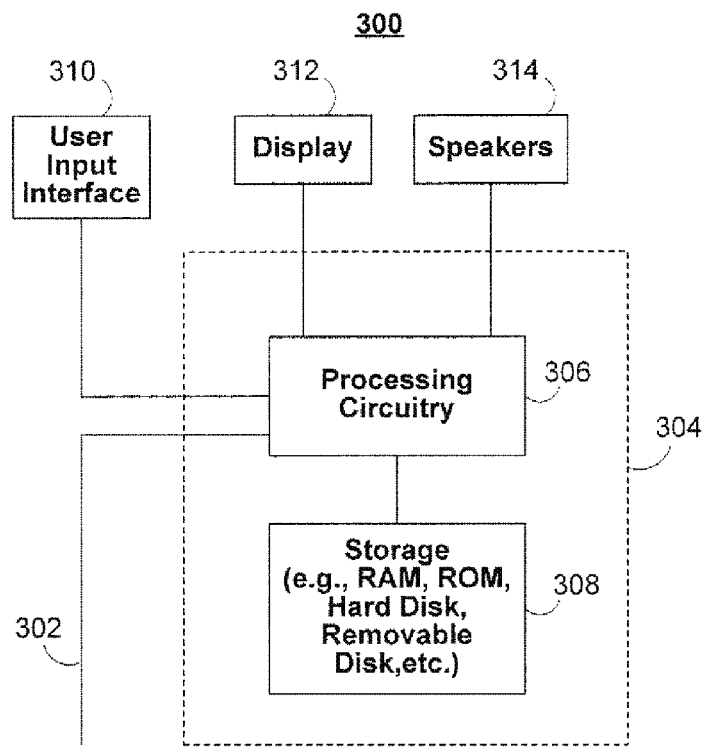
FIG. 3 shows an illustrative user equipment device in accordance with another embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

In some embodiments, control circuitry 304 transmits invitations to one or more other media equipment devices to join a group and/or share interactive media guidance application information through the communications circuitry. For example, control circuitry 304 may receive an instruction from the user to add one or more users to a group of media equipment devices. In response, control circuitry 304 may transmit a communication to each of the users at the various media equipment devices indicating the user's desire to create the group. Systems and methods for creating groups or a community of media equipment devices are described in more detail in Ellis et al. U.S. patent application Ser. No. 11/317,911, filed Dec. 23, 2005, which is hereby incorporated by reference herein in its entirety. The other users of media equipment devices in the group may be located in the same home, different homes, and at one or more geographic locations.

Control circuitry 304 may receive a user selection of a group member that is sharing interactive program guide information. In response, control circuitry 304 may request interactive media guidance application information from the media equipment device corresponding to the selected group member. Control circuitry 304 may receive the interactive media guidance application information and may compare the received guide information with locally stored interactive media guidance application information that is associated with the media equipment device of the requesting user. The user of the media equipment device that is accessing the media equipment device locally is referred to above and below as the first user and the media equipment device the first user is accessing is referred to as the first media equipment device. This nomenclature is used for illustration purposes only. It should be understood that the terms "other users" and "other members" refer to either an individual media equipment device, user or member of a group or a subset of the group (e.g., a household that includes multiple media equipment devices). In some implementations, the first user may be a user browsing a website (or the user currently logged into the website) which provides the user with access to interactive media guidance application information associated with multiple users in a community. In such circumstances, the first media equipment device may be the handheld or computer the first user is using to access the website which may be hosted by a local or remote server. Control circuitry 304 may be in such circumstances at the local or remote server.

In some embodiments, the interactive media guidance application information received from another user may correspond to media that is available in another geographical region that is not available to the first user of the first media equipment device. For example, a second user that is located in California may be exposed to media local to California and thereby may access a media guide with the relevant media information for California. The first user may be in New York and may thereby be associated with interactive media guidance application information that is associated with media available in New York that may not be available in California. Similarly, users that subscribe to different cable, fiber optic or satellite companies in the same or different geographical region may be exposed to and may be receive different media. Control circuitry 304 may compare the interactive media guidance application information received from another media equipment device with the local or first user's interactive media guidance application information to identify similarities (or shared attributes) and differences between the media guidance applications.

In some embodiments, control circuitry 304 may generate a display that includes both the first user interactive media guidance application information (e.g., the local media guidance application) and the interactive media guidance application information received from (or that is associated with) one or more users in the group or community. Control circuitry 304 may generate a display that includes a first grid guide similar to grid 102 (FIG. 1) that includes interactive media guidance application information associated with the first media equipment device (local information) (or the first user) and a second grid guide similar to grid 102 that includes interactive media guidance application information associated with a second media equipment device (remote information) (or second user) from which the interactive media guidance application information was received. In some implementations, control circuitry 304 may include in the display a third, forth or any other number of grids 102 that each corresponds to a different member of the group or community limited only by the physical display constraints. The display generated by control circuitry 304 may display each of the different grids 102 simultaneously. In some implementations, control circuitry 304 may combine all of the interactive media guidance application information from the first media equipment device (or that is associated with the first user) and each of the interactive media guidance application information associated with different users in the group into a combined single grid display similar to grid 102. The user may browse the media listings of each of the displayed grids in a similar manner as grid 102 separately or together.

By providing the first user with a display that includes all of the different interactive media guidance application information associated with different users in the group or community including the interactive media guidance application associated with the first user, the first user can easily identify similarities and differences in media access. In particular, the first user is able to identify which media other users in the group or community are watching, recording, or setting reminders that the user may or may not know about.

In some embodiments, a visual indicator may be provided in the media guidance application information displays provided in the display to inform the user of the similarities (shared attributes) and differences between the interactive media guidance application information associated with the different users. In particular, similarities or shared attributes between media guidance application information associated with multiple users may be present when identical media have been selected by the multiple users of the media guidance application or the two or more media equipment devices. For example, the first grid associated with the first user may include a visual indicator with each media asset listing that corresponds to a media asset that was selected by both the first user and the other member of the group or community that is sharing information.

In some embodiments, differences may be indicated with visual indicators in the interactive media guidance application(s) information that is displayed. In particular, differences between media guidance application information associated with two or more users may be present when a media asset that is available on both the first and another media equipment device (or that is available to first and second users) has been selected by one of the users and not the other. Differences may also be present when media is available on one media equipment device (e.g., because of the service provider or geographical location) (or is available to one user) but not the other media equipment device (or is not available to a second user). For example, the first grid associated with the first user may include a visual indicator with each media asset listing that corresponds to a media asset that was selected by the first user and not the other member of the group or community that is sharing information. In some implementations, the first grid associated with the first user may include a visual indicator with each media asset listing that corresponds to a media asset that was not selected by the first user and was selected by the other member of the group or community that is sharing information.

As referred to herein, a media asset or media is selected when the user purchases or orders the media or media asset, views the media or media asset for a predetermined amount of time (e.g., longer than 5 minutes), sets a reminder for the media or media asset, indicates an interest by setting the media or media asset as a favorite, schedules a media asset series for recording or reminder, and/or schedules a future recording for the media or media asset.

In some embodiments, the first user may assign, to different users, unique visual indicators that indicate similarities and differences between the first user media guidance application information and a shared media guidance application information. For example, the first user may assign a specific color (e.g., blue) to a second user and a different color (e.g., green) to a third user, where the assigned colors indicate similarities (shared attributes) between the first user interactive media guidance application information and the media guidance application information associated with the second and third users. Similarly, the first user may assign a specific color (e.g., yellow) to a second user and a different color (e.g., orange) to a third user, where the assigned colors indicate differences between the first user interactive media guidance application information and the media guidance application information associated with the second and third users. The visual indicator may be a picture, video, icon or some other identifier that is unique to a particular user and that indicates a similarity or difference. In some implementations, the picture, video or icon for a second user may be displayed in the media guidance application information (e.g., with a media listing in grid 102) associated with the first user, where a color shaded in the background of the picture, video or icon indicates a similarity or difference between the guides associated with the second user and the first user.

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control circuitry 304 may store the entire received contents or data of an interactive media guidance application information associated with a second user or member of the group in storage 308. Upon receiving a future request to view the media guidance application information associated with the second user at the first media equipment device, control circuitry 304 may request from the second media equipment device to only send updated media guidance application information. In particular, instead of sending the entire contents of the media guidance application information from the second media equipment device to the first media equipment device, the second media equipment device may transmit only the changes that took place after the prior or initial transmission of the media guidance application information. For example, when a media asset being scheduled for recording is the only change after a first time the first media equipment device receives the media guidance application information from the second media equipment device, the second media equipment device may only transmit the information indicating the media asset that was selected for recording. Control circuitry 304 may update the media guidance application information that is associated with the second user in storage 308 with the updated information.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a standalone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
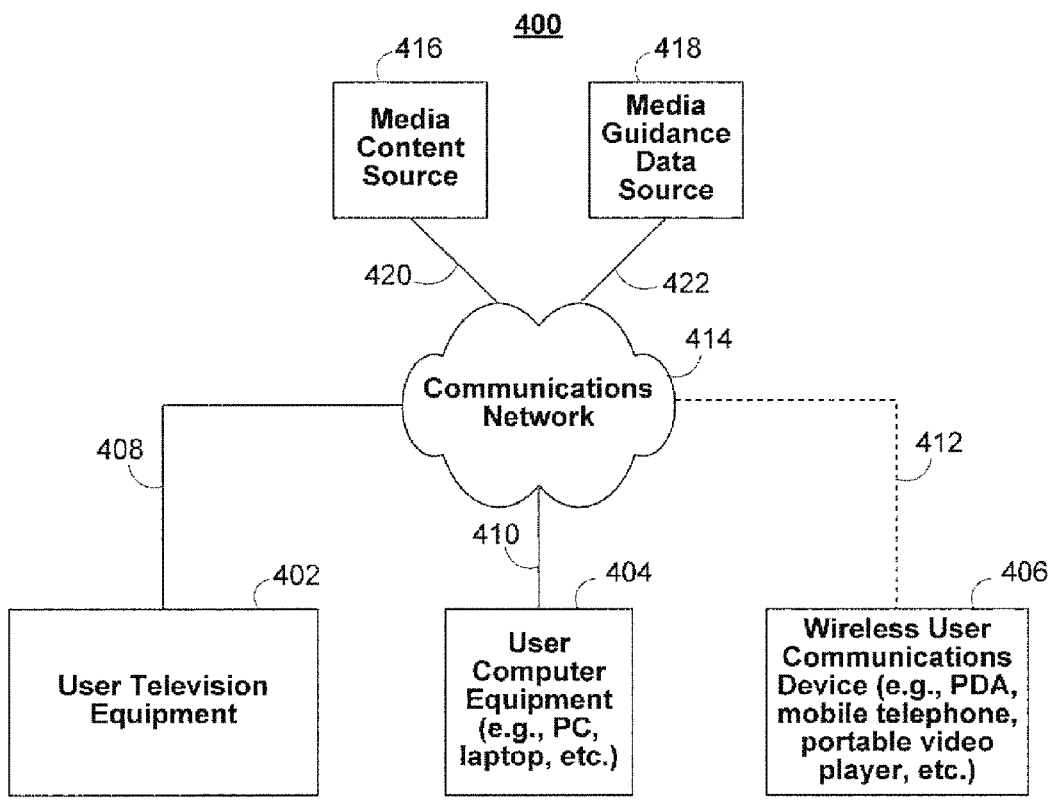
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment, media equipment devices, or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a videocassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data (interactive program guide information), such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data (or media guidance application information) may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player. The settings of each media guidance application may be simultaneously displayed on one media equipment device. For example, the media selected (e.g., scheduled for recording) by the first media equipment device may be displayed in a first window and the media selected (e.g., scheduled for recording) by the second media equipment device may be displayed in a second window. Differences and similarities may be visually indicated in the first and second windows, as discussed above and below in connection with FIGS. 6-8.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content. For example, the first user of the first media equipment device (e.g., a set-top box) may access a display similar to those shown in FIGS. 6-8 using a different media equipment device (e.g., a mobile phone). In particular, the first user may use a mobile phone to view simultaneously interactive media guidance application information associated with the first media equipment device and interactive media guidance application information associated with a media equipment device of a second user or member of the group or community.

It will be appreciated that while the discussion of media content has focused on video content, the principles of media guidance can be applied to other types of media content, such as music, images, etc.

In some embodiments, the user may instruct control circuitry 304 to navigate the user to a display for configuring the users sharing interactive media guidance application information. The first user may configure the first media equipment device with which user or groups to share (or transmit or provide) interactive media guidance application information using the display. The first user may receive and respond to invitations to view a second user's interactive media guidance application information.

Figure 5:
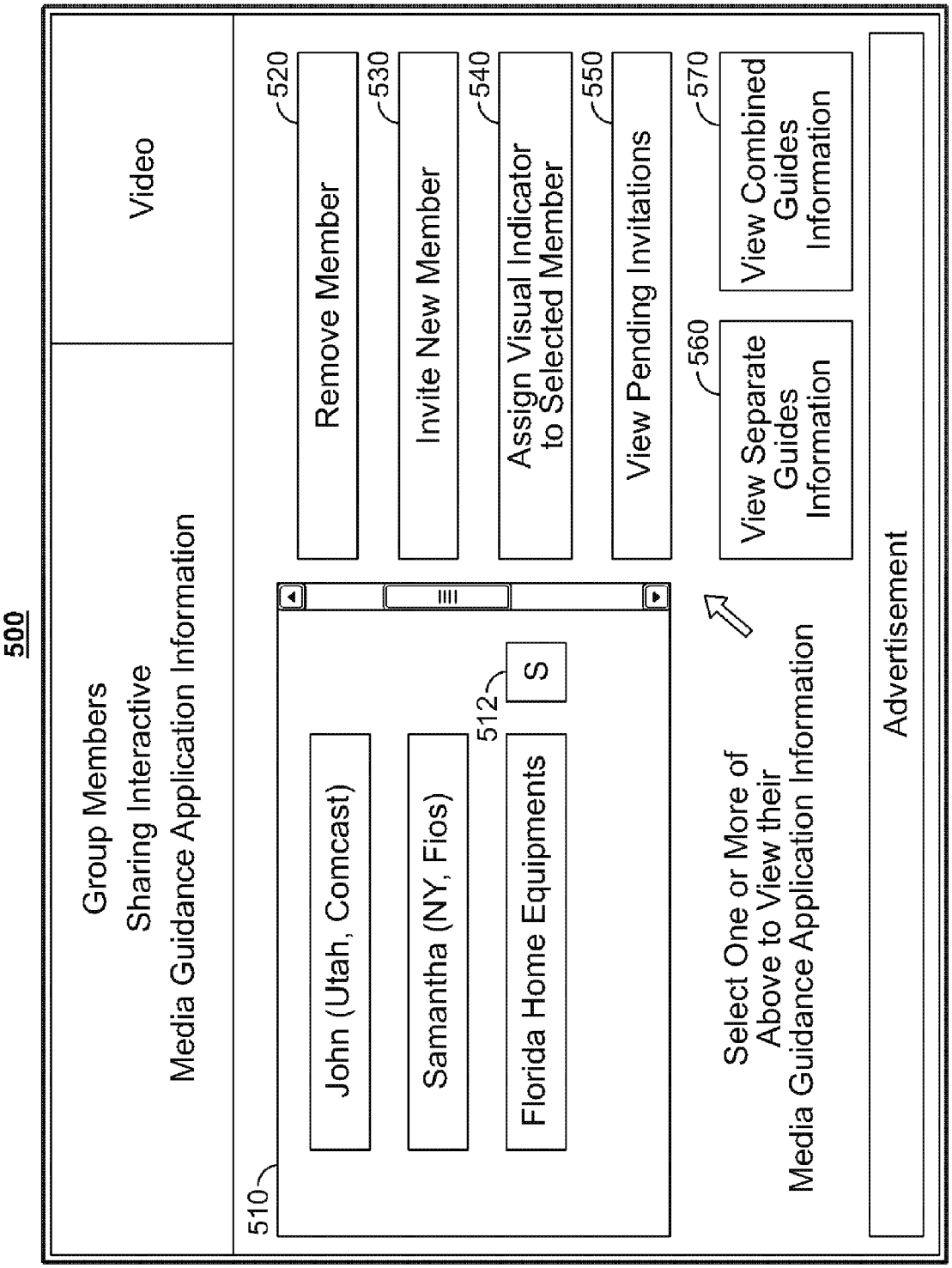
FIG. 5 shows an illustrative display for configuring sharing of interactive media guidance application information between a group in accordance with embodiments of the invention.

FIG. 5 shows an illustrative display 500 for configuring sharing of interactive media guidance application information between a group in accordance with embodiments of the invention. Display 500 includes a user or group selection portion 510, remove member option 520, invite new member option 530, assign visual indicator to selected member option 540, view pending invitations option 550 and view shared media guide options 560 and 570.

User or group selection portion 510 includes a list of users or groups who are sharing interactive media guidance application information. Each user or group that is listed may include an identification of the geographical region associated with the media equipment device of the respective user and/or the service provider associated with the respective media equipment device or user. For example, the user, John, may be using a media equipment device in the state of Utah serviced by the company Comcast. The first user may select one or more of the users or groups listed in portion 510 to view interactive media guidance application information associated with the selected users or groups. A group that is listed in portion 510 may be associated with multiple other users (e.g., all the users within a particular household). When a group is selected for viewing interactive media guidance application information associated with the group, control circuitry 304 may receive an aggregation of the interactive media guidance application information (e.g., the media selected by each of the group members) associated with each member of the selected group. When viewing an interactive media guidance application information that is associated with a particular group, the members of the group may not be individually identified because the first user may only be interested in comparing the first user's selections with the attributes or selections of the selected group as a whole.

An icon 512 may be displayed in portion 510 to indicate that the first user interactive media guidance application information is being shared with a group or user. For example, icon 512 may be displayed next to group "Florida Home Equipments" indicating that the first user is sharing the interactive media guidance application information associated with the first user with each member of the group "Florida Home Equipments". Accordingly, any member of the group "Florida Home Equipments" may view and compare their respective interactive media guidance application information with the interactive media guidance application information associated with the first user.

The sharing of interactive media guidance application information with a user or group may be one-sided. In particular, a first user may share their interactive media guidance application information with a second user allowing the second user to view or monitor and compare the second user's interactive media guidance application information with the first user's interactive media guidance application information. However, the second user may not be sharing the interactive media guidance application information associated with the second user with the first user. This prevents the first user from receiving or viewing interactive media guidance application information associated with the second user despite the fact that the first user is providing (or sharing) interactive media guidance application information to/with the second user. Accordingly, while the second user is able to view the first user's interactive media guidance application information, the first user is not able to view the second user's interactive media guidance application information.

Control circuitry 304 may receive a selection from the first user of one of the users or groups in portion 510 instructing control circuitry 304 to share the interactive media guidance application associated with the first user with the selected one of the users or groups. For example, control circuitry 304 may receive a selection of user "Samantha" and in response control circuitry 304 may share the interactive media guidance application associated with the first user with the user "Samantha". As a result, control circuitry 304 may display icon 512 next to user "Samantha" indicating that control circuitry 304 is sharing (transmitting) upon request the interactive media guidance application information associated with the first user. In some embodiments, control circuitry 304 may first transmit an invitation to the selected user "Samantha" informing the selected user that the first user would like to share the interactive media guidance application information associated with the first user. Upon receiving confirmation from the selected user "Samantha" that the selected user would like to view/access the interactive media guidance application information associated with the first user, control circuitry 304 may start transmitting or sharing the interactive media guidance application information associated with the first user to/with the selected user and display icon 512 next to the selected user.

Control circuitry 304 may receive a user selection of remove member option 520 and, in response, may remove from portion 510 the selected user(s) or group(s). When a user or group is removed from portion 510, control circuitry 304 may prevent or stop sharing the interactive media guidance application information associated with the first user with the removed user. When a user or group is removed from portion 510, control circuitry 304 may prevent the receipt and display of interactive media guidance application information associated with the removed user.

Control circuitry 304 may receive a user selection from the first user of invite new member option 530 and, in response, may prompt the user for information that identifies a user or group to invite. For example, control circuitry 034 may display a prompt that requests the user to input one or more of the following information that is associated with another user or group: telephone number, email address, street address, zip code, country code, IP address, first name, last name, and/or username on a social networking site (e.g., Facebook, Gmail, Myspace, Twitter, etc.). Control circuitry 304 may search the Internet or over a private network for the specified user. Once the specified user is found, control circuitry 304 may provide to the selected user with an invitation request that informs the selected user that the first wants to share with the selected user the interactive media guidance application information associated with the first user. Upon receiving confirmation from the selected user that the selected user accepts the invitation, control circuitry 304 may add the selected user to portion 510 with icon 512 and may transmit interactive media guidance application information to the selected user.

In some embodiments, the first user may configure the type of visual indication that is assigned to particular users or members. In particular, the visual indication that identifies similarities and differences between the first user's interactive media guidance application information and that of another user may be specified by the first user. For example, the first user may configure a first indicator (e.g., color, icon, graphic or video) to be associated with one of the users or groups listed in portion 510 and a different second indicator (e.g., color, icon, graphic or video) to be associated with another one of the users or groups listed in portion 510. The indicator selected for the user or group may be used in the combined or separate guide displays discussed in FIGS. 6-8 to identify the selected user or group to the first user.

In some embodiments, the first user may configure which type of visual indicators (e.g., color, icon, graphic or video) are displayed to indicate similarities (shared attributes) and which type of visual indicators (e.g., color, icon, graphic or video) are displayed to indicate differences between the interactive media guidance application information associated with the first user and the interactive media guidance application information associated with a selected user(s) or member(s) of a group or a group(s). For example, the user may select a blue videocassette icon to be displayed with each media listing that the user "John" selected for recording and a green videocassette icon to be displayed with each media listing that the user "Samantha" selected for recording.

Control circuitry 304 may receive a user selection of view pending invitations option 550 and, in response, may display a prompt that includes a list of users from whom invitations to share their interactive media guidance application information have been received. For example, control circuitry 304 may receive an invitation from a second user on a network to share the interactive media guidance application information associated with the second user. After control circuitry 304 receives the invitation, control circuitry 304 may display a prompt for the first user to accept the invitation. If the first user does not accept the invitation after a predetermined period of time (e.g., 5 minutes) or selects an option to accept later, control circuitry 304 may add the invitation associated with the second user to a list of invitations for display when control circuitry 304 receives the user selection of view pending invitations option 550.

The first user may select one or more users or members listed in portion 510 for which to view the corresponding interactive media guidance application information. In particular, after the user selects the one or more users listed in portion 510, control circuitry 304 may receive a user selection of view separate guides information option 560. Control circuitry 304 may generate a display of interactive media guidance application information associated with two or more users or media equipment devices (one for the first user and another for each selected user) and navigate the user to the generated display, for example, such as the one shown in FIG. 6 or 7. In some implementations, control circuitry 304 may generate a combined display of multiple user guides in response to the user selecting view combined guides information option 570 and navigate the user to a display, for example, such as the one shown in FIG. 8.

Figure 6:
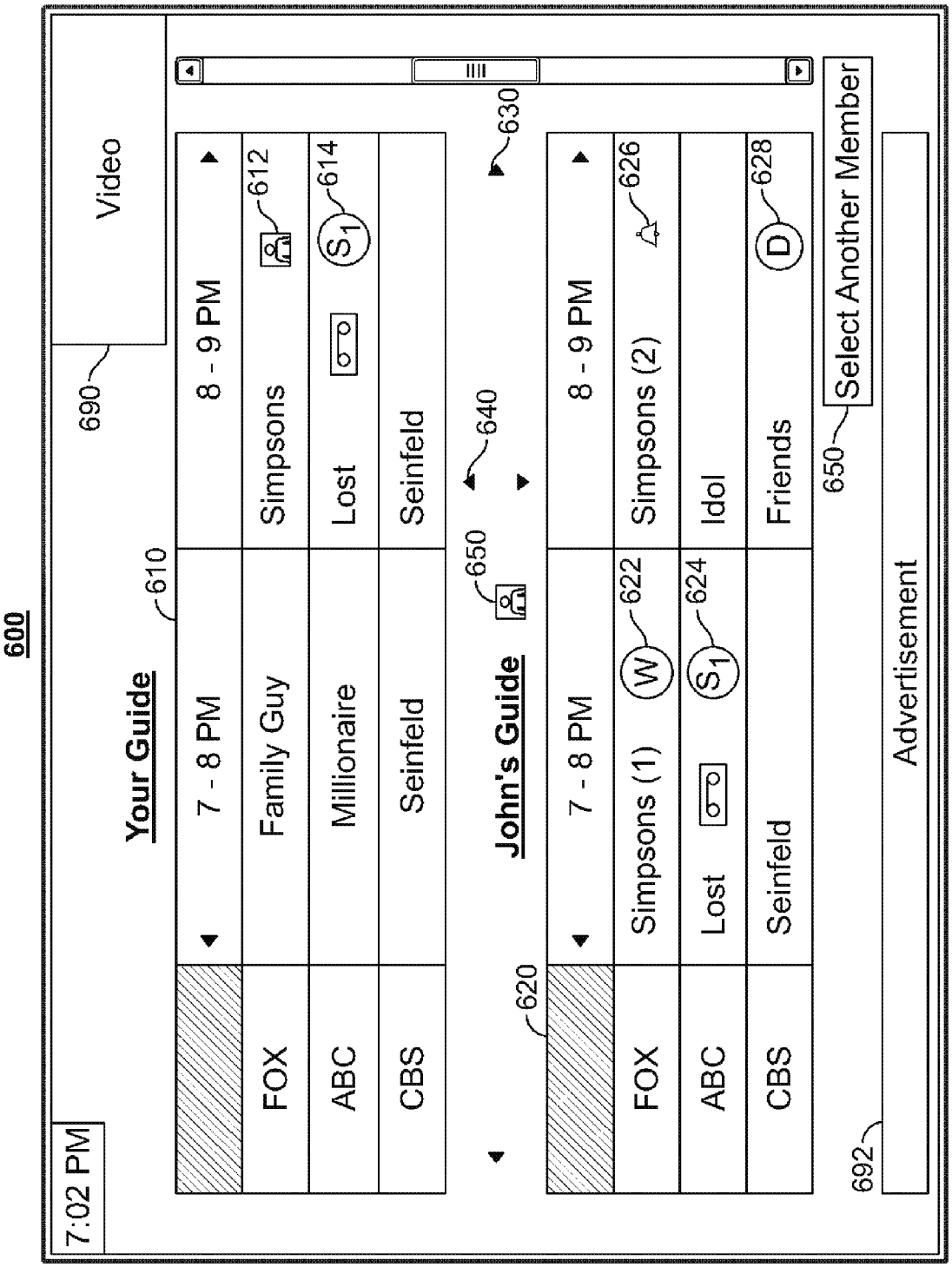
FIG. 6 shows an illustrative display of separate multiple interactive media guidance applications associated with multiple users in accordance with embodiments of the invention.

FIG. 6 shows an illustrative display 600 of separately displaying interactive media guidance application information associated with multiple users in accordance with embodiments of the invention. Display 600 includes a first window 610, a second window 620 and a select another member option 650. First window 610 may include an interactive media guidance application information associated with the first user and second window 620 may include an interactive media guidance application information associated with one of the selected users or members from portion 510 (FIG. 5).

First window 610 may display the interactive media guidance application information associated with the first user in a similar manner and provide similar functionality as grid 102 (FIG. 1). Similarly, second window 620 may display the interactive media guidance application information associated with the second user in a similar manner and provide similar functionality as grid 102 (FIG. 1). The user may navigate the interactive media guidance applications displayed in each of first and second windows 610 and 620 together or separately. In particular, the first user may navigate through the media listings associated with the first user displayed in first window 610 in a similar manner as grid 102 (FIG. 1). The first user may navigate through the media listings associated with the second user displayed in second window 620 in a similar manner as grid 102 (FIG. 1).

Control circuitry 304 may include in or next to each window 610 and 620 and indicator that identifies the user with which the interactive media guidance application information is associated. For example, control circuitry 304 may indicate with textual description "Your Guide" displayed next to first window 610 that the interactive media guidance application information displayed in first window 610 is associated with the first user. Similarly, control circuitry 304 may indicate with icon 650 displayed next to second window 620 that the interactive media guidance application information displayed in second window 620 is associated with the second user. Icon 650 may be assigned automatically or by the first user to uniquely identify the second user. Icon 650 may be a video, photograph, image, graphic, logo, username, text or any other suitable information that uniquely identifies a user to the first user.

The user may navigate through the interactive media guidance application information displayed in second window 620 to identify which media the second user has previously or currently selected (e.g., accessed, watched, viewed, ordered, purchased, scheduled for recording, or set a reminder). For example, a recording icon may be displayed with a media asset listing in the interactive media guidance application information displayed in second window 620 to indicate to the first user that the second user has scheduled for recording or has recorded a media asset corresponding to the listing. In particular, the recording indicator is displayed with the media asset listing "Lost" in second window 620 to indicate to the user that the second user has scheduled for recording the media asset "Lost". Similarly, a reminder indicator 626 may be displayed with a given media asset listing to indicate that the second user has set a reminder for the corresponding media asset. A currently watching indicator 622 may be displayed with a media asset listing to indicate that the second user is currently accessing (watching or viewing) a media asset corresponding to the media asset listing. In some implementations, currently watching indicator 622 may be displayed with each media asset listing in second window 620 that corresponds to a media asset that the second user has previously selected.

Although interactive media guidance application information associated with only two users are shown in FIGS. 6 and 7, interactive media guidance application information associated with any number of additional different users or groups may be displayed limited only by the physical size of the display device.

In some embodiments, the user John may be in a different geographical region than the first user. Accordingly, the interactive media guidance application information associated with the user John that is displayed in second window 620 may include different media listings than the interactive media guidance application information associated with the first user that is displayed in first window 610. In particular, a media shown by the media asset listing as being broadcast during one time period (e.g., Lost broadcast between 8-9 PM) in first window 610 may be shown in second window 620 by the media asset listing as being broadcast during different second time period (e.g., Lost broadcast between 7-8 PM). The media asset corresponding to the media listings displayed in different time intervals in first and second windows 610 and 620 may be the same and accordingly a similarity indicator 624 may be displayed with the media asset listing in the first and or second window 610/620.

In some implementations, similarity indicator 624 may indicate that both the first user and the second user have selected the media asset corresponding to a particular media asset listing. For example, the first user and the second user may have both scheduled the media asset "Lost" for recording. Accordingly, similarity indicator 614 may be displayed with the media asset listing of "Lost" in first window 610 to indicate to the first user that there is a shared attribute (e.g., both have scheduled the media asset for recording) relating to the media asset "Lost" between the first and second users. Similarity indicator 624 may be included with the media asset listing in second window 620 to inform the first user that the second user has scheduled the same media asset "Lost" for recording or has selected the same media asset as the first user.

In some implementations, control circuitry 304 may display with a media asset listing a difference indicator 628. Difference indicator 628 may be displayed in second window 620 to indicate to or alert the first user that there is a difference in media or interactive media guidance application information between the interactive media guidance application information associated with the first user and that which is associated with the second user. For example, difference indicator 628 may be displayed with the media asset listing for the media asset "Friends" displayed in second window 620 because the media asset is available to the second user at 8 PM while a different media asset "Seinfeld" is available to the first user during that timeframe. Difference indicator 628 may be displayed with the media asset listing in second window 620 that diverges from the media listings in first window 610. Alternatively, difference indicator 628 may be displayed with the media asset listing in first window 610 that diverges from the media listings in second window 620.

The user may browse through the entire interactive media guidance application information (media schedule) associated with the second user to see the second user's access history and prior, current and future media selections. For example, the user may browse forward and backward in time in the media listings shown in second window 620 using the right/left arrow keys on the remote control or selecting the appropriate directional arrow keys on the display.

In some embodiments, the user may select right/left directional arrow keys 630 to simultaneously change the time interval displayed in first window 610 and second window 620 forward or backward by a predetermined time period (e.g., 1 hour). For example, the user may select right directional arrow key 630 and in response control circuitry 340 may shift the media listings displayed in first and second windows 610 and 620 over by 1 hour to display the media listings for the next adjacent hour. Similarly, the user may select up/down directional arrow keys 640 to simultaneously change the media source (e.g., CBS, FOX, cable, satellite, HULU.com, website, Internet etc.) displayed in first window 610 and second window 620 to display the next source in the list that follows the first or last source that is displayed.

A visual difference indicator 612 may be provided with a media asset listing in first window 610 to indicate to the first user that another user has selected the media asset corresponding to the media asset listing. For example, visual difference indicator 612 may be an image associated with the second user that identifies the second user to the first user. The second user may have selected (e.g., set a reminder) for the media asset "Simpsons (2)" which may be the same media asset that is associated with the media asset listing for "Simpsons" displayed in first window 610. Accordingly, indicator 612 may be displayed with the media asset listing in first window 610 for the media asset "Simpsons" to identify the second user to the first user and to indicate to the first user that the identified second user has selected the media asset "Simpsons".

Select another member option 650 may be selected to change or add interactive media guidance application information to display 600. For example, control circuitry 304 may prompt the user to select another member in response to receiving the user selection of option 650. After the user selects the additional member control circuitry 304 may change second window 620 to display interactive media guidance application information associated with the selected member. In some implementations, after the user selects the additional member, control circuitry 304 may add a third window (not shown) to display interactive media guidance application information associated with the selected additional member in addition to second window 620 which displays interactive media guidance application information associated with the second user. Each displayed interactive media guidance application information in the windows may include a visual indicator to identify to the first user with which user or member the interactive media guidance application information is associated.

In some embodiments, in addition to media schedule information associated with a second user, control circuitry 304 may retrieve from the second media equipment device ancillary information (e.g., advertisements, description information, preview clips) associated with the media listings in the media schedule information. In some implementations, when the user positions a cursor over a particular media listing displayed in second window 620, control circuitry 304 may automatically (without user input) retrieve from memory, or the media equipment device associated with the interactive media guidance application information displayed in second window 620, an advertisement or preview clip associated with the highlighted media listing. Control circuitry 304 may display the advertisement or preview clip automatically in video window 690 or advertisement region 692. In some implementations, when the user positions a cursor over a particular media asset listing displayed in second window 620 and presses a suitable key (e.g., an INFO key), control circuitry 304 may retrieve from memory, or the media equipment device associated with the interactive media guidance application information displayed in second window 620, a detailed description associated with the highlighted media asset listing. Control circuitry 304 may display the detailed description in a new screen or as an overlay over the first and second windows in the same screen.

Figure 7A:
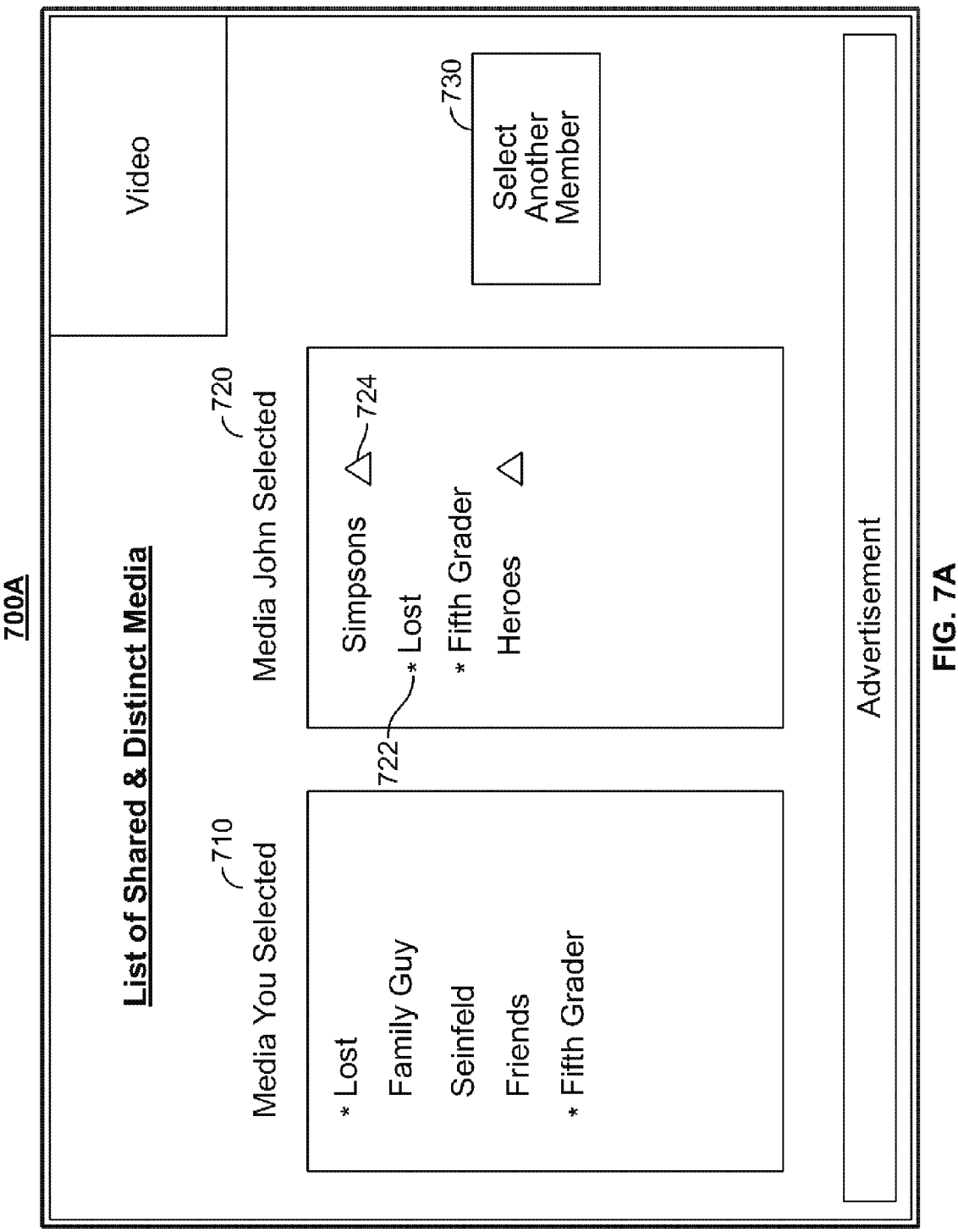
FIG. 7A shows an illustrative display of separately providing multiple user interactive media guidance application information in accordance with embodiments of the invention.

In some embodiments, control circuitry 304 may generate a display that includes a list of media selections made by the first user and media selections made by other users who are sharing their interactive media guidance application information. FIG. 7A shows an illustrative display 700A of separately providing interactive media guidance application information associated with multiple users in accordance with embodiments of the invention. Display 700A includes a first window 710, a second window 720 and a select another member option 730.

First window 710 includes a list of media selections made by the first user with the first media equipment device. Second window 720 includes a list of media selections made by the second user with a second media equipment device. Control circuitry 304 may provide display 700 when the user selects one or more users or members or groups from display 500. Control circuitry 304 may retrieve from the corresponding media equipment devices of the users (or from a profile stored locally associated with the users) interactive media guidance application information associated with the respective users. Control circuitry 304 may process the received interactive media guidance application information to identify media that have been selected by the users of the corresponding media equipment devices. Control circuitry 304 may compile the media selections into windows that correspond to the particular users.

For example, control circuitry 304 may receive interactive media guidance application information from second user "John" and identify which media the second user selected. Control circuitry 304 may display the identified media in second window 720 to indicate to the first user which media the second user selected. Control circuitry 304 may process the local interactive media guidance application information associated with the first user to identify for display media selections made by the first user in first window 710.

Control circuitry 304 may include in first and/or second windows 710 and 720 a similarity visual indicator 722. Similarity visual indicator 722 may identify to the first user the shared media or similarities between the interactive media guidance application information associated with the first and second users. In particular, control circuitry 304 may identify the media asset "Lost" as having been selected (e.g., scheduled for recording) by both the first user and the second user. In response, control circuitry 304 may include similarity visual indicator 722 in one or both windows 710 and 720 that list the media asset "Lost" as a media asset that was selected.

Control circuitry 304 may include in first and/or second windows 710 and 720 a difference visual indicator 724. Difference visual indicator 724 may identify to the first user (or inform the first user about) the differences in media selections or availability between the interactive media guidance application information associated with the first and second users. In particular, control circuitry 304 may identify the media "Heroes" as having been selected (e.g., scheduled for recording) by the second user but not the first user. In response, control circuitry 304 may include difference visual indicator 724 in second window 720 with the media "Heroes". Similarly, control circuitry 304 may identify the media asset "Simpsons" as being available on the second media equipment device but not available on the first media equipment device (e.g., because of a different media market or geographical region). In response, control circuitry 304 may include difference visual indicator 724 in second window 720 with the media "Simpsons".

It should be understood that similarities between media selections made by multiple users may include identical actions made by the multiple users or dissimilar actions made by the multiple users. In particular, when the first user schedules a media asset for recording and the second user schedules the same media asset for recording, there is a similarity between the interactive media guidance application information for the particular media asset. Similarly, when the first user schedules a media asset for recording and the second user watches or sets a reminder for the same media asset, there is still a similarity between the interactive media guidance application information for the particular media asset because both users "selected" the same media asset.

Control circuitry 304 may receive a user selection of option 730 and in response may allow the user to select an additional user or group for which to display a window with their corresponding media selections. Option 730 performs a similar function as option 650 (FIG. 6). After the user selects an additional user or group, control circuitry 304 may add a third window or replace second window 720 with media selections made by the additional user or group that is selected.

The items displayed in windows 710 and 720 may include only media titles that have been selected by the respective users without reference to broadcast times of the corresponding media. This may focus the first user's attention to the identity of the media that were selected without distracting the user with the scheduling information that is displayed in a typical grid such as grid 102 (FIG. 1). When the user selects one of the titles displayed in window 710 or 720, a corresponding preview clip or advertisement may be displayed automatically in another region of the screen.

Figure 7B:
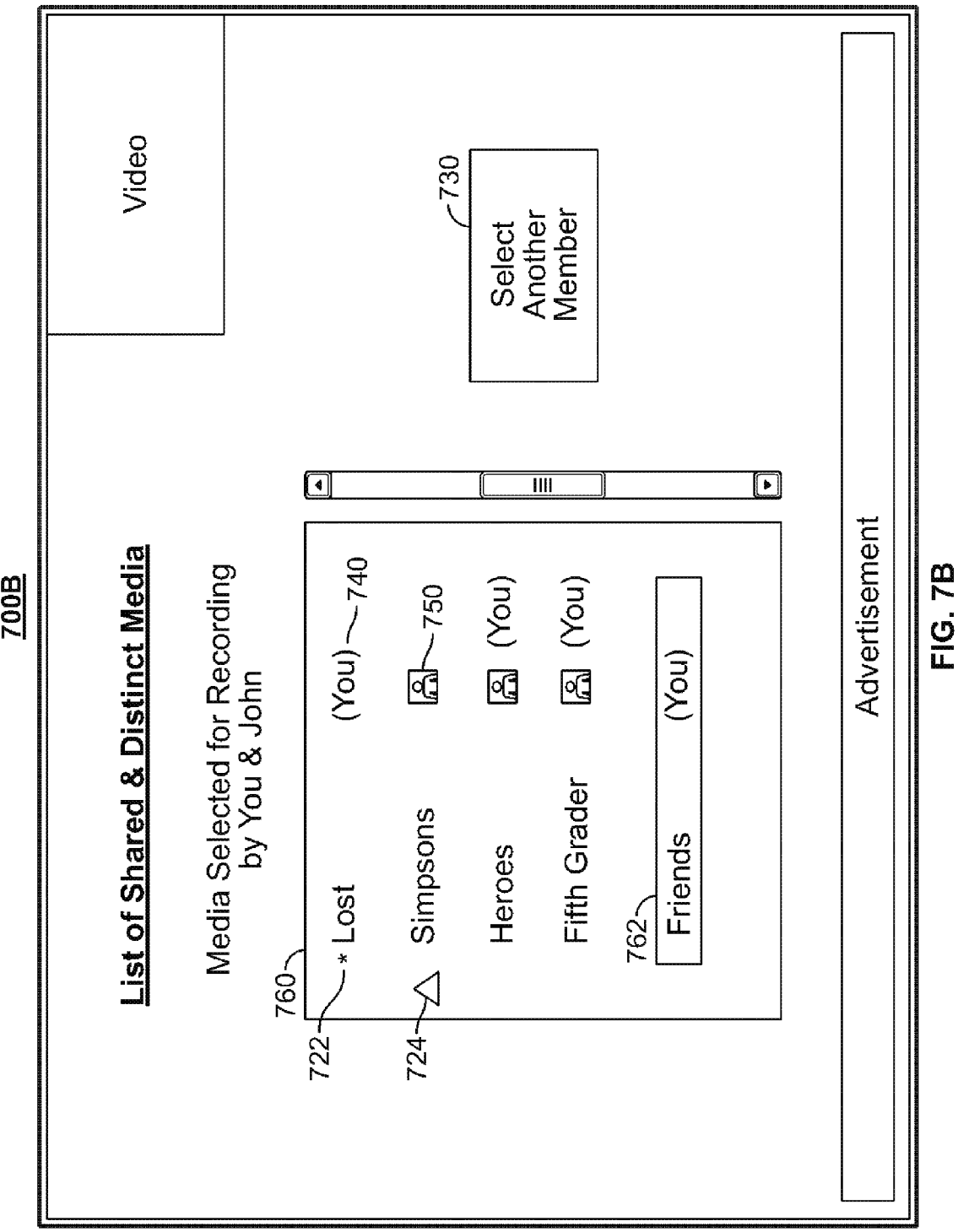
FIG. 7B shows an illustrative display of providing multiple user media selected for recording in a combined display in accordance with embodiments of the invention.

FIG. 7B shows an illustrative display 700b of providing interactive media guidance application information associated with multiple users in a combined display accordance with embodiments of the invention. Display 700B includes a window 760 and select another member option 730.

Window 760 includes a list of each media asset scheduled for recording by each of the selected members of the community and the first user. In particular, control circuitry 304 may process interactive media guidance application information associated with a second user to determine which media the second user selected for recording. Control circuitry 304 may add an identifier (e.g., a title) of each media asset that the second user selected for recording to the media guidance application display shown in window 760. Control circuitry 304 may process interactive media guidance application information associated with the first user to determine which media the second user selected for recording and add an identifier (e.g., a title) of each media asset that the first user selected for recording in window 760. Control circuitry 304 may processes interactive media guidance application information associated with any other member in the community that is sharing interactive media guidance application information with the first user to identify which media has been scheduled for recording by the particular member.

In some embodiments, only a selected subset of the members that are sharing interactive media guidance application information with the first user is processed to identify media that has been scheduled for recording. In particular, display 700b shows only second user "John" as a selected one of the members for which media that the second user scheduled for recording is included in window 760. However, the first user may add additional members for including their associated interactive media guidance application information in window 760 by selected option 730.

Control circuitry 304 may include with each media asset listed in window 760 an identifier of the user(s) that scheduled the corresponding media asset for recording. For example, control circuitry 304 may determine based on the interactive media guidance application information associated with the first user that the first user scheduled the media asset "Lost" for recording. Accordingly, control circuitry 304 may include a media asset listing corresponding to the media asset "Lost" in window 760 and may also include a first identifier 740 of the first user. Similarly, control circuitry 304 may determine based on the interactive media guidance application information associated with the second user "John" that the second user scheduled the media asset "Simpsons" for recording. Accordingly, control circuitry 304 may include a media asset listing corresponding to the media asset "Simpsons" in window 760 and may also include a second identifier 750 of the second user. By providing first and second identifiers 740 and 750 in window 760, the first user that is viewing window 760 and using the interactive media guidance application may more easily distinguish between media asset listings that corresponding to media assets that the first user scheduled for recording from those that another user (e.g., the second user) scheduled for recording.

Control circuitry 304 may include multiple identifiers, each unique to each user of the community members, with a given media asset listings in window 760 to identify all of the users or members that scheduled the given media asset for recording. For example, a media asset (e.g., "Heroes") may have been scheduled for recording by both the first user and the second user. Accordingly, control circuitry 304 may include first identifier 740 (unique to the first user) and second identifier 750 (unique to the second user) with the media asset listing corresponding to the media asset "Heroes" that has been scheduled for recording by both the first and the second users.

In some embodiments, control circuitry 304 may include with each media asset listing provided in window 760 a similarity indicator 722. Similarity indicator 722 may indicate that a media asset corresponding to the media asset listing has been selected by the first user and another one of the selected members (e.g., the second user). In particular, although the second user may not have scheduled the media asset "Lost" for recording and therefore second identifier 750 is not included with the media asset listing for the media asset "Lost" similarity indicator 722 is included. More specifically, because the second user may have selected the media asset "Lost" (e.g., by scheduling a reminder or viewing the media asset) but has not scheduled the media asset for recording, control circuitry 304 may provide similarity indicator 722 to indicate the shared attribute (e.g., both users selected the corresponding media asset—the first user may have scheduled the media asset for recording and the second user may have scheduled a reminder for the media asset).

In some embodiments, control circuitry 304 may include with each media asset listing provided in window 760 a difference indicator 724. Difference indicator 722 may indicate that a media asset corresponding to the media asset listing has not been selected by the first user and has been selected by another one of the selected members (e.g., the second user). Cursor 762 may be navigated by the user to select any one of the media asset listings to view, access or get additional information for (e.g., display a preview clip) an associated media asset.

Although display 700b is described in the context of identifying media scheduled for recording in the interactive media guidance application information associated with the various users or members, any other type of media selection(s) may be provided instead or in addition. For example, instead of including media scheduled for recording in window 760, control circuitry 304 may identify media for which the users or members scheduled a reminder and include identifiers (e.g., titles) of the identified media in window 760. Similarly, instead of including media scheduled for recording in window 760, control circuitry 304 may identify media that the users or members have previously or currently accessed and include identifiers (e.g., titles) of the identified media in window 760.

Figure 8:
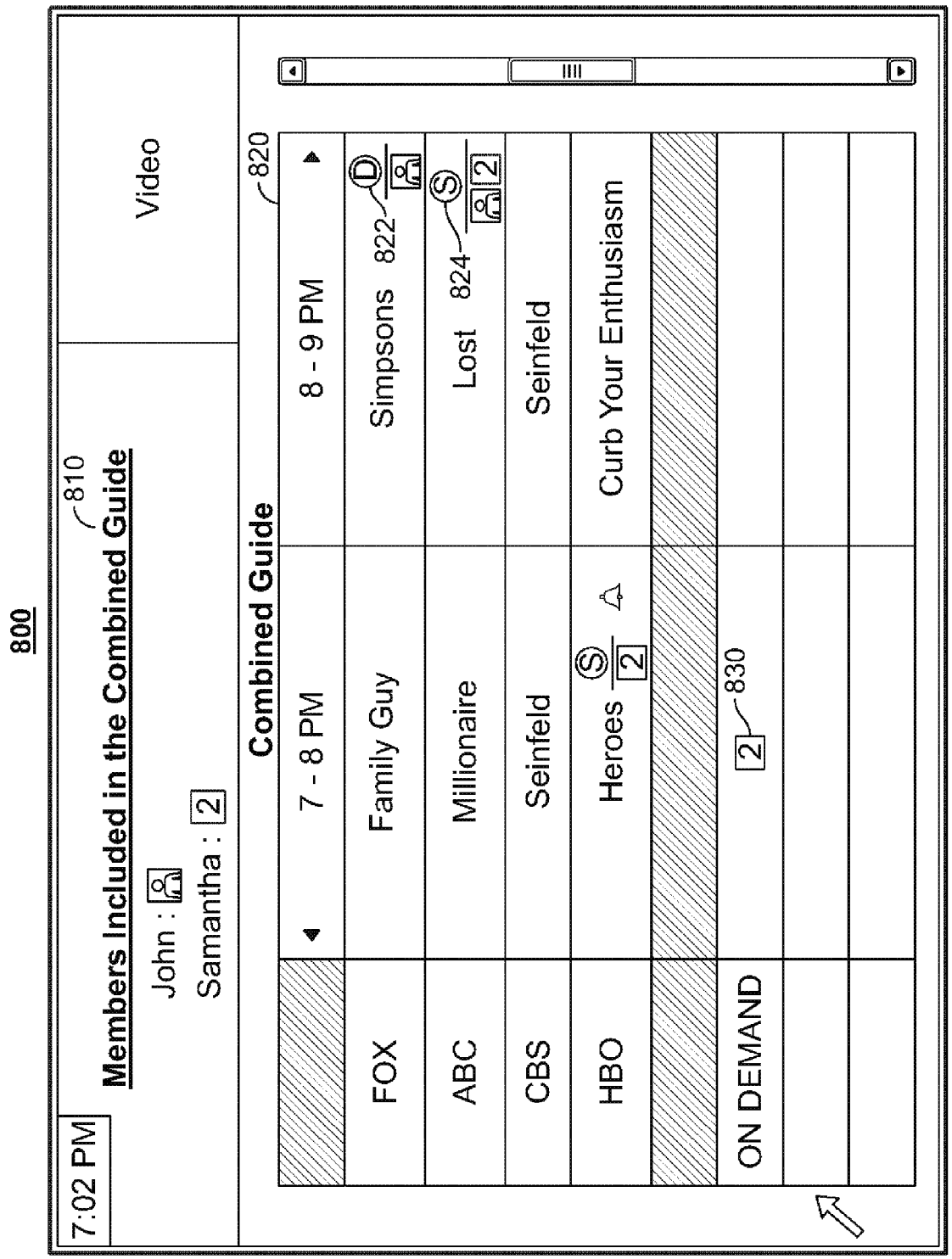
FIG. 8 shows an illustrative display of a combined interactive media guidance application in accordance with embodiments of the invention.

In some embodiments, control circuitry 304 may generate a display that includes interactive media guidance application information associated with multiple users in a combined grid format. FIG. 8 shows an illustrative display 800 of a combined interactive media guidance application information in accordance with embodiments of the invention. Display 800 includes a member identification region 810 and a media information region 820. Media information region 820 may have the same or similar functionality as grid 102 (FIG. 1).

In some implementations, control circuitry 304 may combine the interactive media guidance application information received from (or associated with) each of the users or members or groups that the first user selects (e.g., using screen 500) into a single grid display. Control circuitry 304 may disregard any media schedule times discrepancies in generating the combined display. In particular, control circuitry 304 may identify which media have been selected by various users and identify those media in the interactive media guidance application information associated with the first user. Control circuitry 304 may provide a visual indication in media information region 820 that identifies which of the selected users has selected a media shown in region 820 using their respective media equipment device.

For example, control circuitry 304 may generate a difference indicator 822 that indicates that the second user but not the first user selected a particular media asset (e.g., the media asset Simpsons). Difference indicator 822 may be displayed with the media asset listing for the particular media asset along with some indication that is unique to the user that selected the media asset. In particular, control circuitry 304 may provide in member identification region 810 a map that informs the first user about which unique indicator is associated with particular users. For example, a photograph may be associated with user John and a number may be associated with another user Samantha. Control circuitry 304 may display in the combined guide the indicator unique to the particular user to indicate to the first user who has shared or different media selections from the first user.

In some embodiments, control circuitry 304 may generate a similarity indicator 824 that indicates that the first, second and third users selected a particular media asset (e.g., the media asset Lost). Similarity indicator 824 may be displayed with the media asset listing for the particular media along with some indication that is unique to the user(s) that selected the media asset. In particular, the first user may just by looking at region 820, determine that users John and Samantha both selected a same media asset (e.g., Lost) as did the first user since both of their unique indicators are displayed with similarity indicator 824 in the media asset listing for the media asset "Lost". Similarly, the first user may just by looking at region 820, determine that user Samantha but not John selected a media asset (e.g., Heroes) as did the first user since only of the unique indicator associated with Samantha is displayed with similarity indicator 824 in the media asset listing for the media asset "Heroes".

In some embodiments, control circuitry 304 may determine which media the selected users currently have selected (e.g., currently being viewed). Control circuitry 304 may provide an indication in region 820 of the currently selected media of each selected user by displaying the unique indicator of the selected users with the media asset listing corresponding to the currently selected media asset. For example, indicator 830 is displayed with the media source ON DEMAND to indicate that the user Samantha who is associated with indicator 830 is currently accessing a media asset from the ON DEMAND media source.

In some embodiments, control circuitry 304 of the first media equipment device may perform the processing to generate the separate or combined media guidance application information displays, compare the first and the second interactive media guidance application information, and receive user selections on a remote server. For example, the first media equipment device may be a mobile device (e.g., a mobile telephone) that may request the separate or combined display of the first and second interactive media guidance application information through a website hosted by a web server. The web server may receive the request, and process information associated with the first and second users (e.g., the first and second interactive media guidance application information) to generate the two or more grid or combined grid displays that include the similarity or differences visual indicators as discussed above. The generated display may be provided to the user at the mobile device in the form of a website. In such implementations, the mobile device may not be required to store all the interactive media guidance application information for all the users and/or perform the various computations and comparisons to generate the displays.

For example, the first user may use the first media equipment device to log onto a website that provides access to an interactive media guidance application. The website may be hosted by a server that runs the interactive media guidance application. Each of the members in the community including the first user may log on or access the website hosted by the server to view interactive media guidance application information associated with the particular user. In particular, the server may maintain user profiles for each of the members and may provide media guidance application information that is associated with a particular user and their preferences (e.g., geographical region in which the user accesses media and favorite media of the user). The first user may access the website and navigate to a web page that includes the windows and displays discussed in connection with FIGS. 5-8. More specifically, the first user may request from the server an interactive media guidance application display that provides interactive media guidance application information for the first user and at least one of the other members in the community that is sharing interactive media guidance application information with the first user. The server may generate an interactive media guidance application display that indicates the similarities or differences among the interactive media guidance application information associated with each of the users.

This approach provides a client-server interaction where no substantial processing need be performed on the client device. In particular, in order to generate the interactive media guidance application displays that convey the interactive media guidance application information associated with the plurality of users to the first user, control circuitry 304 may need to perform various comparisons among the various interactive media guidance application information associated with the various users. This comparison may be performed on the server that is hosting the website and may therefore be avoided from being performed on the first media equipment device that the first user is using to access the interactive media guidance application on the website. In addition, the client-server based approach allows all of the interactive media guidance application information associated with the various users to be centralized in one location (e.g., the server) and accordingly the most up-to-date information may always be available to the requesting users on the server.

Figure 9:
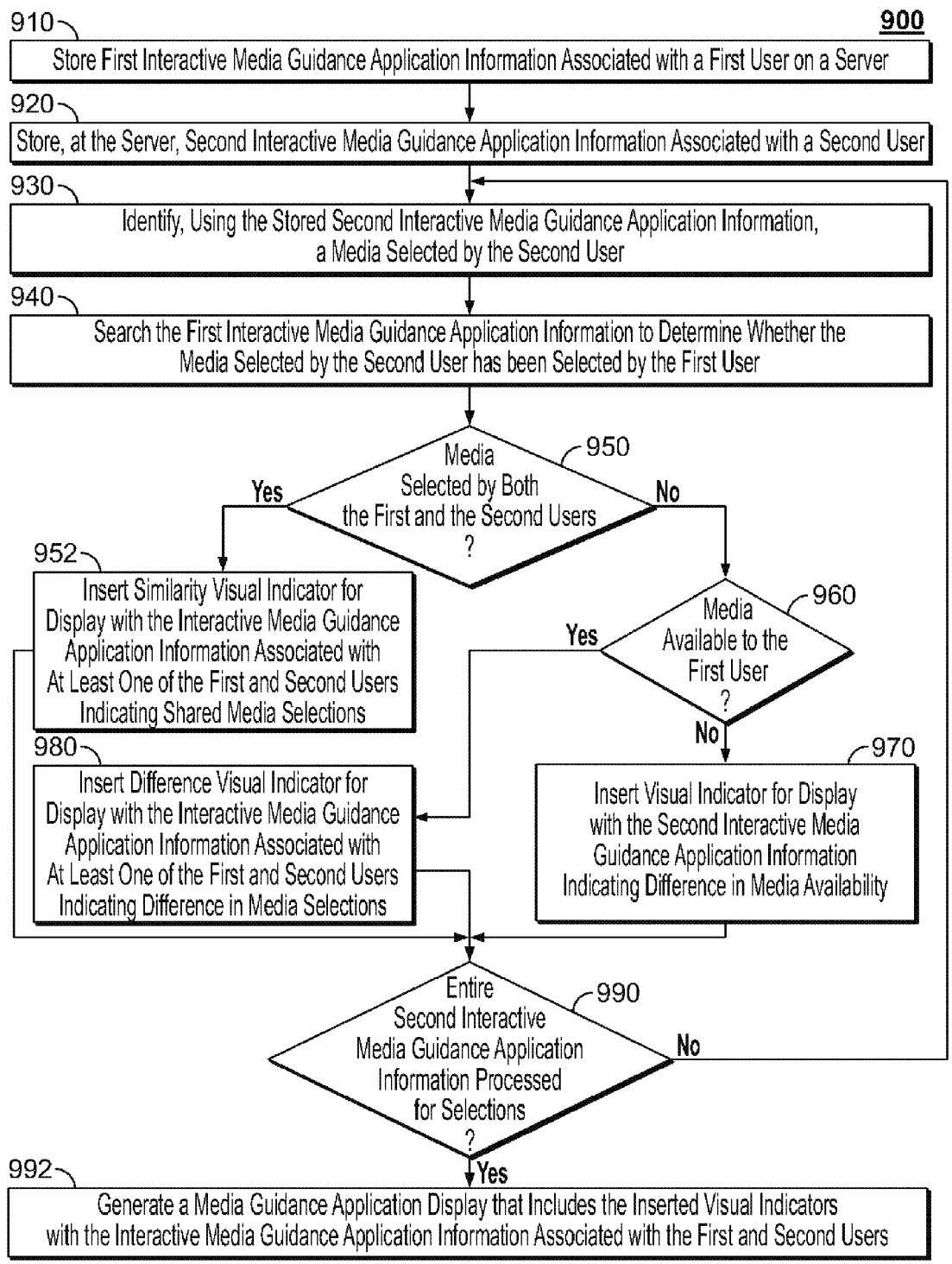
FIG. 9 illustrates a flow diagram for sharing interactive media guidance application information in accordance with an embodiment of the invention.

FIG. 9 illustrates a flow diagram 900 for sharing interactive media guidance application information in accordance with an embodiment of the invention. At step 910, first interactive media guidance application information associated with a first user is stored on a server. For example, control circuitry 304 may receive and store media schedule information associated with the first user or media equipment device in storage 308 (FIG. 3). The media schedule information may be displayed in grid 102 (FIG. 1).

At step 920, second interactive media guidance application information associated with a second user is stored at the server. For example, a user of the first media equipment device may select one or more members of the group which are sharing their interactive media guidance application information to view their shared interactive media guidance application information. Control circuitry 304 may receive from the media equipment device of the selected members (e.g., the second media equipment device) (directly through a peer-to-peer connection or indirectly through a remote server) interactive media guidance application information corresponding to media available and selected with the second media equipment device.

At step 930, a media asset selected by the second user is identified using the stored second interactive media guidance application information. For example, control circuitry 304 may search the second interactive media guidance application information to identify whether and which media have been selected (e.g., viewed for a predetermined period of time, accessed for a predetermined period of time, scheduled for recording, ordered, have had a reminder set, etc.) by the second user using the second media equipment device.

At step 940, the first interactive media guidance application information is searched to determine whether the media asset selected by the second user has been selected by the first user. For example, control circuitry 304 may search storage 308 in the first media equipment device to find media that correspond to the media (e.g., identical media) selected by the second user. In some implementations, control circuitry 304 may examine a local directory of recorded media in the first media equipment device to determine whether the first user selected the same media as the second user of the second media equipment device (e.g., whether the media in the directory match the media selected on the second media equipment device).

At step 950, a determination is made as to whether the media asset has been selected by both the first and the second users. When the media has been selected by both the first and the second users, the process proceeds to step 952, otherwise the process proceeds to step 960.

At step 952, a similarity visual indicator is inserted for display with the interactive media guidance application associated with at least one of the first and second users indicating shared media selections. For example, similarity indicator 614/624 may be provided with one or both of the interactive media guidance application information displays that are displayed to indicate to the first user that there is a shared media asset selection (FIGS. 6 and 7). In particular, similarity indicator 624 may be inserted into the second interactive media guidance application information 620 indicating that the media asset "Lost" has been selected by both the first user and the second user. The similarity indicator may have a unique attribute to identify the second user to the first user such that when the first user sees the indicator the first user associates the similarity indicator with the second user. This is most helpful in the combined guide display 800 where multiple users' selections are shown in a single grid 102.

At step 960, a determination is made as to whether the media asset is available to the first user or first media equipment device. When the media is available to the first user or first media equipment device, the process proceeds to step 980, otherwise the process proceeds to step 970. For example, the second user may be in a different geographical region than the first user and may therefore be provided with different media availability than the first user. For example, while the media source FOX is broadcasting a local show in California, the same media source FOX may be broadcasting a different show in NY. Accordingly, the media listing for the local show may be available in the second interactive media guidance application information but not in the first interactive media guidance application information.

At step 980, a difference visual indicator is inserted for display with the interactive media guidance application information associated with at least one of the first and second users indicating difference in media selections. For example, difference indicator 626 may be inserted to indicate that a reminder is set for a media asset displayed in the second interactive media guidance application information but not the first interactive media guidance application information display.

At step 970, a visual indicator is inserted for display with the second interactive media guidance application information display indicating difference in media availability. For example, difference indicator 628 may be inserted to indicate that the media asset listing corresponding to a local media asset may not be available to the first user or to the first media equipment device.

At step 990, a determination is made as to whether the entire second interactive media guidance application information has been processed for selections. When the entire second interactive media guidance application information has been processed, the process proceeds to step 992, otherwise the process returns to step 930.

At step 992, a media guidance application display is generated that includes the inserted visual indicators with the interactive media guidance application information associated with the first and second users.

The above described embodiments of the present disclosure are presented for purposes of illustration and not of limitation, and the present disclosure is limited only by the claims which follow.

What is claimed is:

1. A method for sharing interactive media guidance application information, the method comprising:
receiving, from a first user, a selection of a first function to perform on a given media, wherein the first function is associated with a first visual representation;
receiving, from a second user, a selection of a second function to perform on the given media, wherein the second function includes functionality different from functionality offered by the first function, wherein the second function is associated with a second visual representation;
storing, at a server, in association with the first user, a first indication of the given media in association with the first function, and storing, at the server, in association with the second user, a second indication of the given media in association with the second function;
identifying a similarity between the first indication and the second indication based on the first indication and the second indication both corresponding to the given media;
identifying a difference between the first indication and the second indication based on the first indication and the second indication each corresponding to different functions to perform on the given media; and
automatically, in response to identifying the similarity and the difference, generating for simultaneous display a visual indication that indicates (1) the similarity, (2) the difference, and (3) the identity of the second user, wherein the visual indication indicates the difference by presenting, separately from indicating the identity of the second user, the first visual representation of the first function and the second visual representation of the second function, the generating for simultaneous display further comprising:
generating for display a first window, the first window including:
the first indication,
a first visual indicator with a first media asset identifier in the first window that corresponds to an identical media asset selected by the first and second users, and
a second visual indicator with a second media asset identifier that corresponds to a media asset selected by the first but not the second user, wherein the second visual indicator specifically identifies the first user;
generating for display a second window that includes:
the second indication, and
a third visual indicator with a third media asset identifier in the second window that corresponds to a media asset selected by the second but not the first user, wherein the third visual indicator specifically identifies the second user; and
generating for display the visual indication in at least one of the first and second windows.

2. The method of claim 1, wherein each of the first indication and the second indication comprises different media schedule information.

3. The method of claim 1, wherein the similarity between the first indication and the second indication comprises a selection of an identical media asset for recording, viewing, or setting a reminder made by both the first and the second users.

4. The method of claim 1, wherein storing the second indication comprises receiving, at the server from a media equipment device associated with the second user, an identifier of media selections made by the second user of media available to the second user.

5. The method of claim 1, wherein the selection of the identical media asset includes scheduling the identical media asset for recording, previously accessing the identical media asset, currently viewing the identical media asset, downloading the identical media asset, and scheduling a reminder for the identical media asset.

6. The method of claim 1, wherein generating for display comprises:
generating for display a media guidance application display screen;

combining, in the media guidance application display screen, the first indication with the second indication into a combined media information display, wherein the combined media information display includes media information corresponding to the first indication generated for display with media information corresponding to the second indication;

generating, on the media guidance application display screen, for display a first visual indicator with each media asset listing in the combined media information display that corresponds to an identical media asset selected by the first and the second users; and generating, on the media guidance application display screen, for display a second visual indicator with each media asset listing in the combined media information display that corresponds to a media asset selected with one and not the other of the first and second users, wherein the second visual indicator specifically identifies the one of the first and second users.

7. The method of claim 1, wherein each of the first and second users are associated with respective first and second media equipment devices, wherein the first and second media equipment devices belong to a group of media equipment devices, wherein each media equipment device in the group is associated with a different user of a plurality of users.

8. The method of claim 1, wherein the visual indication that indicates the similarity between the first indication and the second indication visually distinguishes the second user from other users.

9. The method of claim 1, wherein the visual indication indicates the difference by indicating the functionality of the first function and the functionality of the second function.

10. A system for sharing interactive media guidance application information, the system comprising:
a storage device; and
control circuitry configured to:
receive, from a first user, a selection of a first function to perform on a given media, wherein the first function is associated with a first visual representation;
receive, from a second user, a selection of a second function to perform on the given media, wherein the second function includes functionality different from functionality offered by the first function, wherein the second function is associated with a second visual representation;
store, in the storage device at a server, in association with the first user, a first indication of the given media in association with the first function, and store, in the storage device at the server, in association with the second user, a second indication of the given media in association with the second function;
identify a similarity between the first indication and the second indication based on the first indication and the second indication both corresponding to the given media;
identify a difference between the first indication and the second indication based on the first indication and the second indication both corresponding to different functions to perform on the given media; and
automatically, in response to identifying the similarity and the difference, generate for simultaneous display a visual indication that indicates (1) the similarity, (2) the difference, and (3) the identity of the second user, wherein the visual indication indicates the difference by presenting, separately from indicating the identity of the second user, the first visual representation of the first function and the second visual representation of the second function, the generating for display simultaneous display further comprising:
generating for display a first window, the first window including:
the first indication,
a first visual indicator with a first media asset identifier in the first window that corresponds to an identical media asset selected by the first and second users, and
a second visual indicator with a second media asset identifier that corresponds to a media asset selected by the first but not the second user, wherein the second visual indicator specifically identifies the first user;
generating for display a second window that includes:
the second indication, and
a third visual indicator with a third media asset identifier in the second window that corresponds to a media asset selected by the second but not the first user, wherein the third visual indicator specifically identifies the second user; and
generating for display the visual indication in at least one of the first and second windows.

11. The system of claim 10, wherein each of the first indication and the second indication comprises different media schedule information.

12. The system of claim 10, wherein the similarity between the first indication and the second indication comprises a selection of an identical media asset for recording, viewing, or setting a reminder made by both the first and the second users.

13. The system of claim 10, wherein the control circuitry is further configured to receive, at the server from a media equipment device associated with the second user, an identifier of media selections made by the second user of media available to the second user.

14. The system of claim 10, wherein the selection of the identical media asset includes scheduling the identical media asset for recording, previously accessing the identical media asset, currently viewing the identical media asset, downloading the identical media asset, and scheduling a reminder for the identical media asset.

15. The system of claim 10, wherein the control circuitry is further configured to, when generating for display:
combine the first indication with the second indication into a combined media information display, wherein the combined media information display includes media information corresponding to the first indication generated for display with media information corresponding to the second indication;
generate for display a first visual indicator with each media asset listing in the combined media information display that corresponds to an identical media asset selected by the first and the second users; and
generate for display a second visual indicator with each media asset listing in the combined media information display that corresponds to a media asset selected with one and not the other of the first and second users, wherein the second visual indicator specifically identifies the one of the first and second users.

16. The system of claim 10, wherein each of the first and second users are associated with respective first and second media equipment devices, wherein the first and second media equipment devices belong to a group of media equipment devices, wherein each media equipment device in the group is associated with a different user of a plurality of users.

17. The system of claim 10, wherein the visual indication that indicates the similarity between the first indication and the second indication visually distinguishes the second user from other users.

18. The system of claim 10, wherein the visual indication indicates the difference by indicating the functionality of the first function and the functionality of the second function.

* * * * *